(12) United States Patent  (10) Patent No.: US 8,265,711 B2
Shim  (45) Date of Patent: Sep. 11, 2012

(54) DATA PROCESSING SYSTEM AND METHOD FOR IN-VEHICLE SHORT RANGE WIRELESS COMMUNICATION NETWORK

(75) Inventor: Sang Pil Shim, Seoul (KR)

(73) Assignee: Samsung Electronics Co., Ltd (KR)

( * ) Notice: Subject to any disclaimer, the term of this patent is extended or adjusted under 35 U.S.C. 154(b) by 956 days.

(21) Appl. No.: 11/840,807

(22) Filed: Aug. 17, 2007

(65) Prior Publication Data

US 2008/0076483 A1  Mar. 27, 2008

(30) Foreign Application Priority Data

Sep. 22, 2006 (KR) .................. 10-2006-0092202

(51) Int. Cl.
*H04M 1/00* (2006.01)

(52) U.S. Cl. ............... 455/569.2; 455/569.1; 455/575.9; 455/3.06

(58) Field of Classification Search ............... 455/569.2, 455/569.1, 575.9, 3.06
See application file for complete search history.

(56) References Cited

U.S. PATENT DOCUMENTS

| | | | |
|---|---|---|---|
| 7,190,798 B2* | 3/2007 | Yasuhara | 381/86 |
| 7,251,507 B2* | 7/2007 | Kitao et al. | 455/569.2 |
| 7,546,188 B2* | 6/2009 | Nezu et al. | 701/36 |
| 2005/0032528 A1 | 2/2005 | Dowling et al. | |
| 2005/0176445 A1 | 8/2005 | Qu et al. | |
| 2006/0063532 A1 | 3/2006 | Chou et al. | |

FOREIGN PATENT DOCUMENTS

| | | |
|---|---|---|
| JP | 2002150495 | 5/2002 |
| JP | 2004356873 | 12/2004 |
| JP | 2005117482 | 4/2005 |
| KR | 1020050041366 | 5/2005 |
| KR | 1020060005931 | 1/2006 |
| KR | 1020060024046 | 3/2006 |

* cited by examiner

*Primary Examiner* — Nghi H Ly (74) *Attorney, Agent, or Firm* — The Farrell Law Firm, P.C.

(57) ABSTRACT

A data processing system and method for an in-vehicle short range wireless communication network are provided. The data processing system and method enable providing audio data of at least one source through different output means, while displaying video data corresponding to the audio data on a single display. The data processing system of the present invention includes a speaker installed within a vehicle; a master terminal mounted onto the vehicle for outputting an audio through the speaker; and a first slave terminal for outputting an audio received from the master terminal through a wireless channel established between the master and first slave terminals.

16 Claims, 10 Drawing Sheets

DATA PROCESSING SYSTEM AND METHOD FOR IN-VEHICLE SHORT RANGE WIRELESS COMMUNICATION NETWORK

PRIORITY

This application claims priority to an application entitled "DATA PROCESSING SYSTEM AND METHOD FOR IN-VEHICLE SHORT RANGE WIRELESS COMMUNICATION NETWORK" filed in the Korean Intellectual Property Office on Sep. 22, 2006 and assigned Serial No. 2006-0092202, the contents of which are incorporated herein by reference.

BACKGROUND OF THE INVENTION

1. Field of the Invention

The present invention relates to an in-vehicle short range wireless communication network and, in particular, to a data processing system and method for an in-vehicle short range wireless communication network that are capable of providing audio data of at least one source through different output means, while displaying video data corresponding to the audio data on a single display.

2. Description of the Related Art

The advance of mobile communication technologies enable people to communicate with each other at anytime and anywhere. With the tendency of technology convergence, mobile terminals have integrated various supplementary functions such as text messaging, picture presentation, music playback, and gaming. Recently, the capability of a mobile terminal is expanded through internetworking with other digital devices. Short range wireless communication technologies serve as a replacement for cables for connecting digital devices, including mobile terminals.

Meanwhile, automobiles are commonly equipped with audio/video systems and some of them integrate navigation systems. More recently, automobiles are employing advanced audio/video and navigation systems that support wireless connections with other devices, particularly mobile phones. One of the useful functions of the audio/video and navigation system is a hands-free function. When the audio/video and navigation system supports wireless communication with a mobile phone, the audio/video and navigation system can output the audio data received from the mobile phone through a short range wireless channel, i.e. wireless hands-free function.

However, the conventional audio/video and navigation system has a drawback in that, when it operates the hands-free function, other on-going audio output must be disabled, whereby passengers that are not participating in the telephone conversation may lose important information during the hands-free session.

SUMMARY OF THE INVENTION

The present invention has been made in an effort to solve the above problems, and it is an object of the present invention to provide a data processing system and method for an in-vehicle short range wireless communication network that are capable of providing at least two output channels.

It is another object of the present invention to provide a data processing system and method for an in-vehicle short range wireless communication network that are capable of providing video and audio data from different sources at the same time.

It is another object of the present invention to provide a data processing system and method for an in-vehicle short range wireless communication network that are capable of providing a driver with navigation data and providing passengers with digital broadcast data.

In accordance with an aspect of the present invention, the above and other objects are accomplished by a data processing system for an in-vehicle network. The data processing system includes a speaker installed within a vehicle; a master terminal mounted onto the vehicle for outputting an audio data through the speaker; and a first slave terminal for outputting an audio data received from the master terminal through a wireless channel established between the master and first slave terminals.

Preferably, the audio output by the first slave terminal is identical with the audio output through the speaker.

Preferably, the master terminal comprises a first multimedia source for generating first audio and video data; a second multimedia source for generating second audio and video data; and a display for displaying the first and second videos at the same time.

Preferably, the first multimedia source is a navigation function and the first audio data is transmitted to the first slave terminal.

Preferably, the second multimedia source is a digital broadcast reception function.

Preferably, the data processing system further includes a second slave terminal for receiving digital broadcast data and transmitting the broadcast data to the master terminal through a wireless channel established between the second slave terminal and the master terminal.

Preferably, the data processing system further includes a third slave terminal for receiving the audio data from the master terminal through another wireless channel established between the third slave terminal and the master terminal and for outputting the received audio data.

Preferably, the wireless channels are Bluetooth® (hereinafter "Bluetooth") radio channels.

Preferably, the first and second audio data are transmitted in accordance with an Advanced Audio Distribution Profile (A2DP) and the first and second videos are transmitted in accordance with a Video Distribution Profile (VDP).

In accordance with another aspect of the present invention, the above and other objects are accomplished by a data processing method for an in-vehicle wireless network including a master terminal and at least one slave terminal. The data processing method includes outputting an audio data of a first multimedia source of the master terminal through a speaker installed within a vehicle; and outputting an audio data of a second multimedia source of the master terminal through the slave terminal.

Preferably, the audio output through the slave terminal is identical with the audio output through the speaker.

Preferably, outputting an audio data of the second multimedia source includes requesting, at the slave terminal, the audio signal of the second multimedia source; and transmitting, at the master terminal, the audio signal of the second multimedia source to the slave terminal.

Preferably, the data processing method further comprises displaying a video data of the first multimedia source and a video data of the second multimedia source on a display of the master terminal at the same time.

Preferably, the first multimedia source is a navigation function and the second multimedia source.

Preferably, the second multimedia source is a digital broadcast function.

Preferably, outputting an audio data of a first multimedia source includes transmitting, at the master terminal, the audio data of the first multimedia source to the slave terminal through a wireless channel established between the speaker and the master terminal.

Preferably, the data processing method further includes receiving, at the master terminal, the audio data of the first multimedia source from another slave terminal through a wireless channel established between the slave terminal and the master terminal.

Preferably, the wireless channel is a Bluetooth radio channel.

Preferably, the audio data are transmitted in accordance with an Advanced Audio Distribution Profile (A2DP) and the video data are transmitted in accordance with a Video Distribution Profile (VDP).

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Data Processing System According to a First Embodiment

Figure 1:
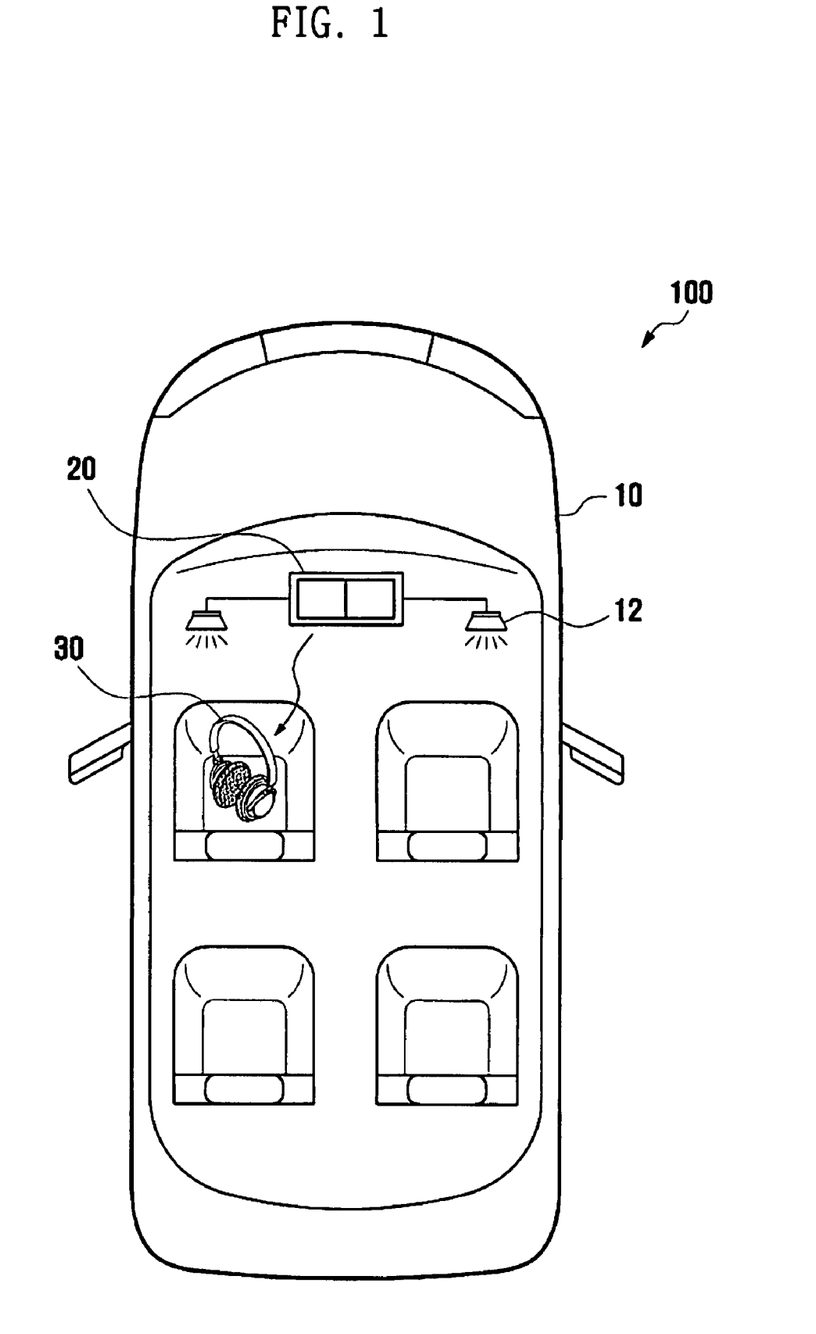
FIG. 1 is a schematic diagram illustrating an in-vehicle short range wireless network having a data processing system according to an exemplary embodiment of the present invention.

Referring to FIG. 1, a data processing system 100 implemented within a vehicle 10 includes a speaker 12, a master terminal 20, and a slave terminal 30. The speaker 12 is preferably an inbuilt speaker installed while manufacturing the vehicle 10.

Figure 2:
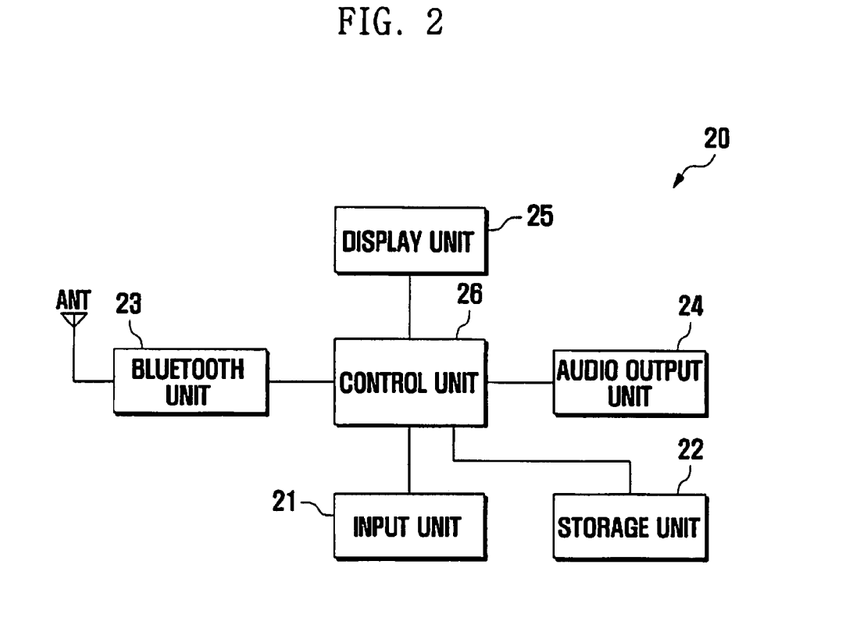
FIG. 2 is a block diagram illustrating a configuration of a master terminal 20 of FIG. 1.

FIG. 2 is a block diagram of the master terminal 20 of FIG. 1. The master terminal 20 is installed in the vehicle 10 and outputs audio data through the speaker 12 as audible sound. The master terminal 20 also can transmit the audio data to another device through a short range wireless communication channel.

Figure 3:
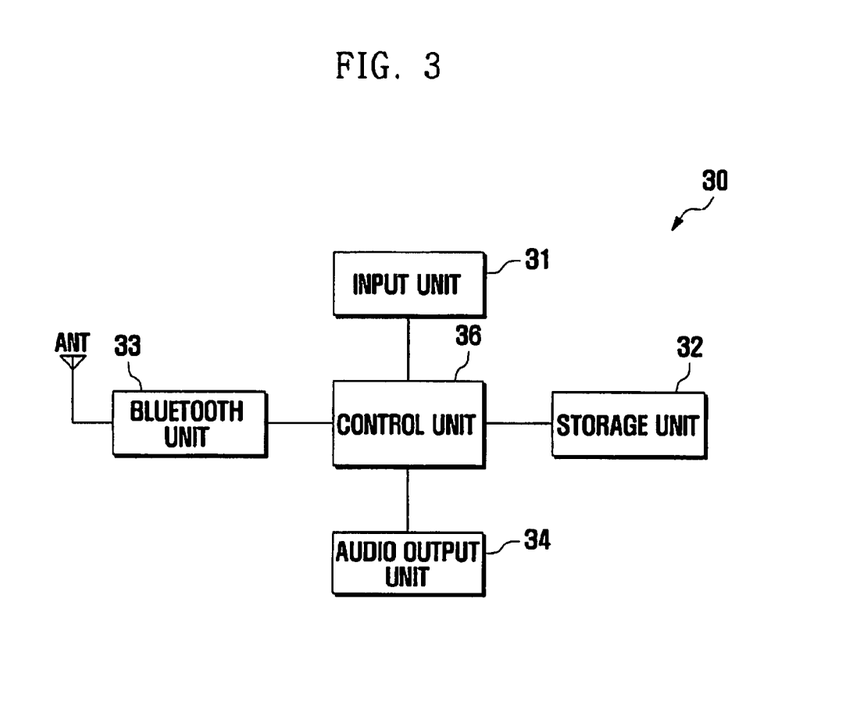
FIG. 3 is a block diagram illustrating a configuration of a slave terminal 30 of FIG. 1.

FIG. 3 is a block diagram of the slave terminal 30 of FIG. 1. The slave terminal 30 can receive the audio data transmitted by the master terminal 20 and output the audio data in the form of audible sound through its speaker. Typically, the slave terminal 30 is a hands-free set paired with the master terminal 20 and belongs to a driver.

The master terminal 20 and the slave terminal 30 are connected through a wireless channel established on the basis of a short range wireless communication standard such as Bluetooth, infrared, Zigbee, Ultra Wideband (UWB), and Near Field Communication. In this embodiment, the present invention is described with Bluetooth as the short range communication standard for establishing a communication channel between the master and slave terminals 20 and 30.

As shown in FIGS. 2 and 3, the master and slave terminals 20 and 30 are provided with Bluetooth modules 23 and 33, respectively. A short range communication channel is established through inquiry and connection procedures. With Bluetooth, a distance between the master and slave terminals 20 and 30 is limited to about 10 m. The master terminal 20 is set as a master device and the slave terminal 30 is set as a slave device for Bluetooth communication. The master and slave terminals 20 and 30 communicate with each other in accordance with Bluetooth protocol.

Referring to FIG. 2, the master terminal 20 includes an input unit 21, a storage unit 22, a Bluetooth unit 23, an audio output unit 24, a display unit 25, and a control unit 26. The master terminal 20 can be implemented as a multi function terminal supporting audio/video playback, navigation, and digital broadcast functions. The navigation function provides coordinate information received from a Global Positioning System (GPS) together with a voice guidance. The audio/video playback function enables playing multimedia such as compact discs (CDs), video CDs (VCDs), and digital video discs (DVDs) titles. The digital broadcast function is implemented with a multimedia processor or a digital broadcast receiver so as to receive and play broadcast programs.

The input unit 21 is provided with a plurality of keys for manipulating the master terminal 20, and transfers signals generated by pressing the keys to the control unit 26. Particularly, the input unit 21 is provided with keys for controlling the short range wireless communication.

The storage unit 22 stores application programs for executing various functions of the master terminal 20 and data generated while operating the functions. The data includes audio and video data received through wired and wireless channels.

The Bluetooth unit 23 enables the master terminal 20 to communicate with the slave terminal 30 using Bluetooth protocol. The Bluetooth unit 23 establishes a Bluetooth channel between the master terminal 20 and the slave terminal 30 such that the master and slave terminals 20 and 30 can exchange control and data signals through the Bluetooth channel. Particularly, the Bluetooth unit 23 modulates audio data so as to produce Bluetooth signals. The Bluetooth signal is amplified and then transmitted to the slave terminal 30 through an antenna (ANT). The Bluetooth unit 23 also receives control signals from the slave terminal 30 and transfers the control signals to the control unit 26. Here, the audio data is exchanged in accordance with an Advanced Audio Distribution Profile (A2DP).

The audio output unit 24 can output the audio data through its own speaker or through the speaker 12 built in the vehicle 10. The audio output unit 24 and the speaker 12 can be connected through a wired channel or a wireless channel. The audio data includes first and second audio data.

The display unit 25 displays video data. The video data includes first video data associated with the first audio data, and second video data associated second audio data. The display unit 25 can display the first and second video data at the same time.

The control unit 26 controls general operations of the master terminal 20. Particularly, the control unit 26 receives control signals input through the input unit 21 and outputs the audio data through the speaker 12 or transmits the audio data to the slave terminal 30 through the Bluetooth unit 23.

For example, in the case that the master terminal 20 integrates at least one of the audio/video playback, navigation, and digital broadcast functions, and the first audio and video data represent navigation data, the second audio and video data may represent audio/video file data or digital broadcast data.

The slave terminal 30 includes an input unit 31, a storage unit 32, a Bluetooth unit 33, an audio output unit 34, and a control unit 35. The slave terminal 30 can be a headset, MP3 player, or a mobile phone, equipped with the Bluetooth unit 33 for Bluetooth communication with the master terminal 20. The mobile terminal includes a cellular phone, a laptop computer, a Personal Digital Assistant (PDA), and Portable Multimedia Player (PMP). In this embodiment, the slave terminal 30 is represented by the headset.

The input unit 31 is provided with a plurality of keys for manipulating the slave terminal 30, and transfers signals generated by pressing the keys to the control unit 36. For example, the input unit 31 includes keys for power on/off, audio reception, volume adjustment, and short range wireless communication.

The storage unit 32 stores application programs for executing functions of the slave terminal 30 and a control program for interoperating with the master terminal 20.

The Bluetooth unit 33 enables the slave terminal 30 to communicate with the master terminal 20 using Bluetooth protocol. The Bluetooth unit 33 establishes a Bluetooth channel with the master terminal 20 such that the master and slave terminals can exchange control and data signals through the Bluetooth channel. Here, the audio data are exchanged in accordance with A2DP.

The audio output unit 34 can output the audio data received from the master terminal 20. The audio output unit 34 includes an audio processor for demodulating the received audio data and a speaker for outputting the demodulated audio data in the form of an audible sound.

The control unit 36 controls general operations of the slave terminal 30. Particularly, the control unit 36 receives the audio data according to the control signal input through the input unit 31 and outputs the received audio data through the audio output unit 34.

Data Processing Method According to First Embodiment

Figure 4:
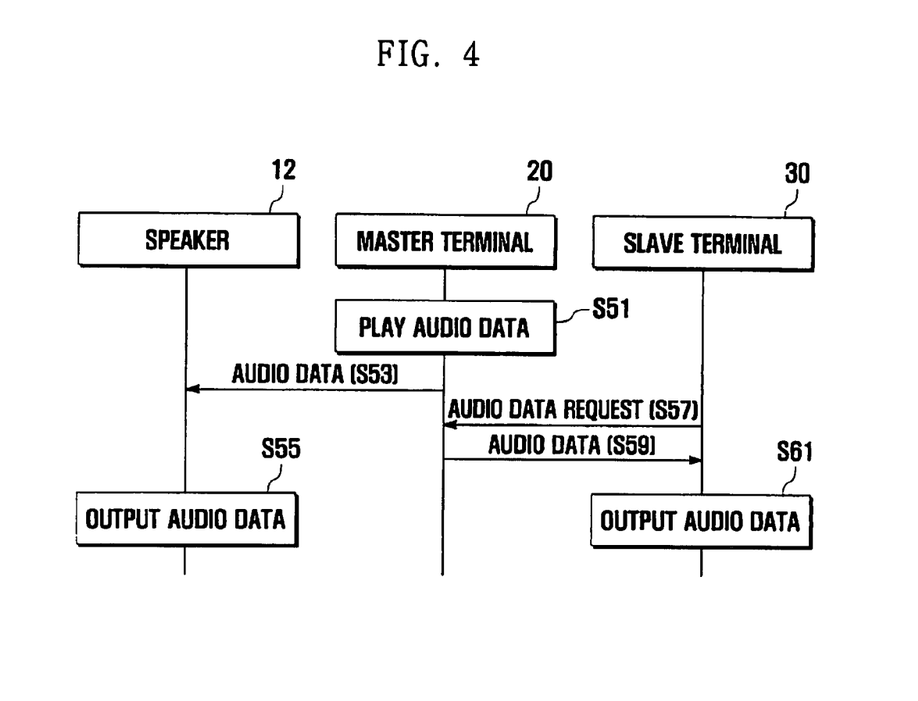
FIG. 4 is a signal flow diagram illustrating a data processing method according to an exemplary embodiment of the present invention.

FIG. 4 is a signal flow diagram illustrating a data processing method according to an exemplary embodiment of the present invention.

Referring to FIGS. 1 to 4, the master terminal 200 plays audio data in step S51 and transmits the audio data to the speaker 12 of the vehicle 10 in step S53. The audio data is output in the form of an audible sound through the speaker 12 in step S55.

If a control signal for requesting audio data is input through the input unit 31, the slave terminal 30 transmits an audio request signal to the master terminal 20 through a short range wireless communication channel in step S57. If an audio requesting signal is received, the master terminal 20 transmits the audio data to the slave terminal 30 through the short range communication channel in step S59.

The slave terminal 30 outputs the received audio data through the audio output unit 34 in the form of audible sound in step S61. Accordingly, a person having the slave terminal 30 can listen to the audio sound.

In this embodiment, the person having the slave terminal 30 can listen to the audio transmitted from the master terminal 20 through the short range wireless communication channel. While transmitting the audio data, the master terminal 20 can output the audio data through the speaker 12 at the same time.

In this embodiment, the audio data played at the master terminal 20 is transmitted to the slave terminal 30 through the short range wireless communication channel. However, the present invention is not limited thereto. For example, the audio data generated at the slave terminal 30 can be transmitted to the master terminal 20 through the short range wireless communication channel such that the master terminal 20 outputs the audio data received from the slave terminal 30 through the speaker 12.

Data Processing Method According to Second Embodiment

Unlike the data processing method of the first embodiment in which the identical audio data are transmitted to the slave terminal 300 and output through the speaker at the same time, the audio processing method according to the second embodiment outputs different audio data to the speaker 12 and the slave terminal 30.

Figure 5:
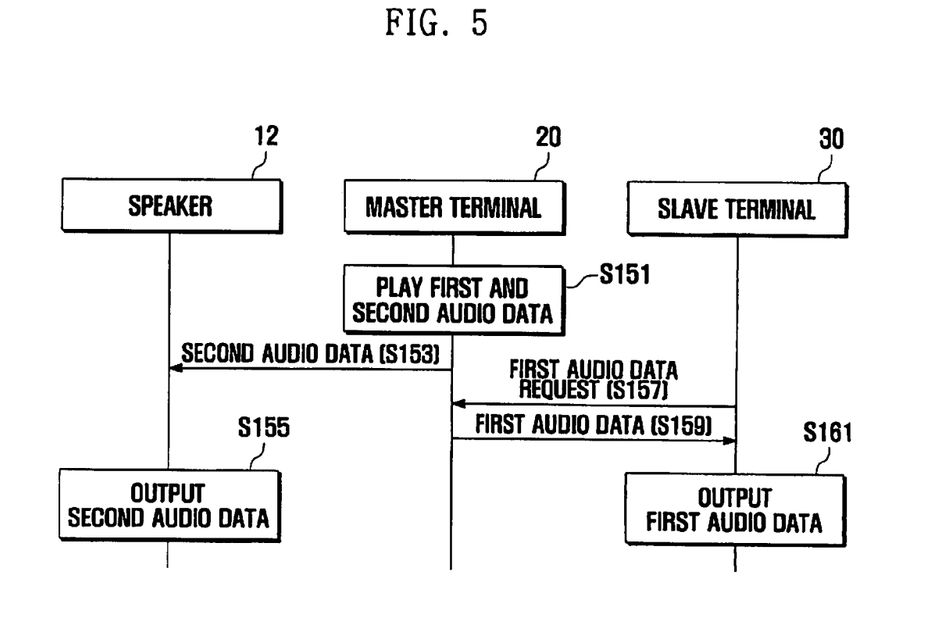
FIG. 5 is a signal flow diagram illustrating a data processing method according to another exemplary embodiment of the present invention.

FIG. 5 is a signal flow diagram illustrating a data processing method according to another exemplary embodiment of the present invention in which a driver and passengers can listen to different audio sources.

Referring to FIGS. 1 to 3 and 5, the master terminal 20 plays first and second audio data in step S151. In this embodiment, the first and second audio data are output by means of the navigation function and MP3 playback function.

The master terminal 20 transmits the second audio data through the speaker 12 installed within the vehicle 10 in step S153 such that the speaker 12 outputs the audio data in the form of an audible sound in step S155. If an audio request signal for the first audio data is received from the slave terminal 30 while transmitting the second audio data to the speaker 12 in step S157, the master terminal 20 transmits the first audio data to the slave terminal 30 through a short range wireless communication channel established between the master and slave terminal 20 and 30. The slave terminal 30 outputs the first audio data received from the master terminal 20 through the audio output unit 34 in step S161.

In this embodiment, the person having the slave terminal 30 listens to the first audio data received from the master terminal 20 through the short range wireless communication channel. On the other hand, another person who does not have the slave terminal 30 can listen to the second audio data output through the speaker 12. If the slave terminal 30 is occupied by the driver, the driver can activate the navigation function as a first audio source and the MP3 playback function as a second audio source such that the driver can listen to the audio navigation guidance as the first audio data while the passengers listen to the MP3 music as the second audio data.

Data Processing Method According to Third Embodiment

In this embodiment, the data processing method enables the provision of video data in addition to the audio data.

Figure 6:
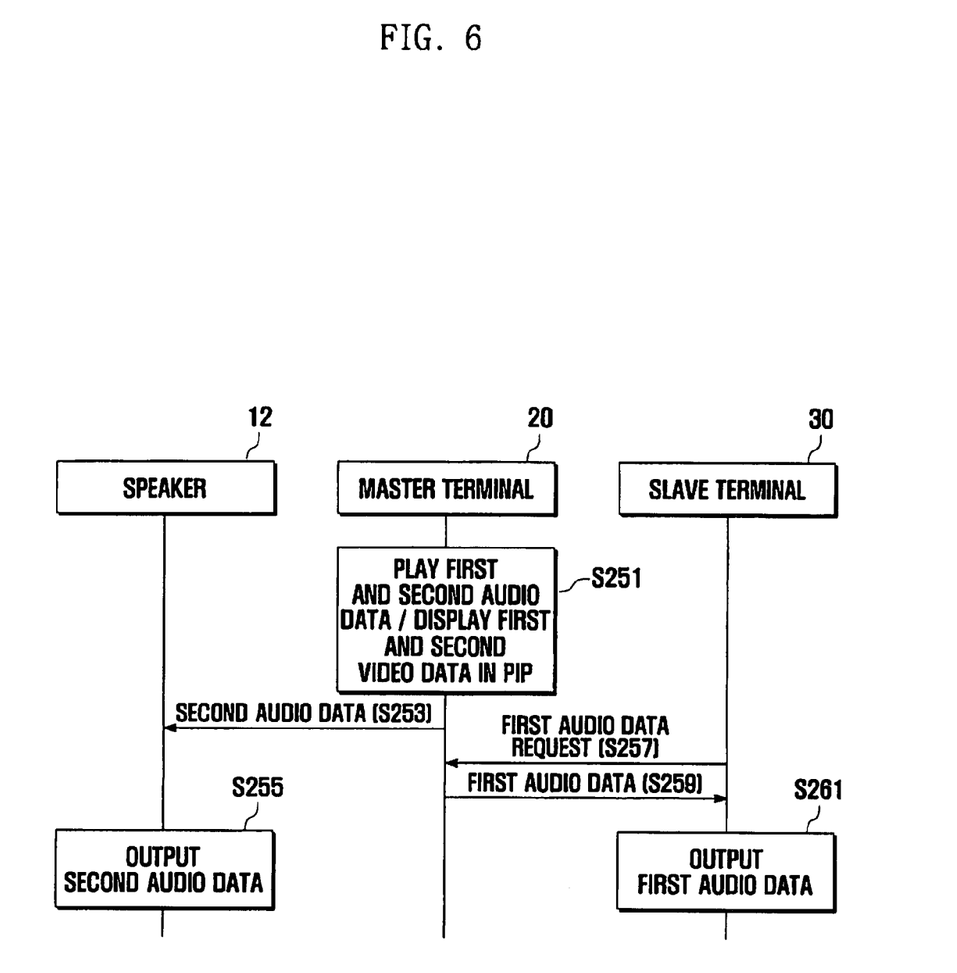
FIG. 6 is a signal flow diagram illustrating a data processing method according to another exemplary embodiment of the present invention.

FIG. 6 is a signal flow diagram illustrating a data processing method according to another exemplary embodiment of the present invention.

Referring to FIGS. 1 to 3 and 6, the master terminal 20 plays first and second multimedia sources such that first and second video data are displayed on the display unit 25 at the same time in step S251. The first and second video data are displayed in the form of Picture-In-Picture (PIP). In the case that the first and second multimedia sources are the navigation function and digital broadcast reception function, the first multimedia source provides a navigation screen as the first video data and an audio navigation guidance as the first audio data, and the second multimedia source provides a broadcast program screen as the second video data and a broadcast program audio as the second audio data.

The master terminal 20 transfers the second audio data through the speaker 12 installed within the vehicle 10 in step S253 and the speaker 12 outputs the second audio data received from the master terminal 20 in the form of audible sound in step S255. If a second audio request signal is received from the slave terminal 30 in step S257, the master terminal 20 transmits the second audio data to the slave terminal 30 through a short range wireless communication channel established between the master and slave terminals 20 and 30 in step S259. The slave terminal 30 outputs the second audio data received from the master terminal 20 through the audio output unit 34 in step S261.

In this embodiment, a person, i.e. the driver, having the slave terminal 30 can listen to the first audio data received through the short range wireless communication channel while viewing the first video data through the display unit 25. Meanwhile, another person, i.e. the passenger, who does not have the slave terminal 30 can listen to the second audio through the speaker 12 installed within the vehicle 20 while viewing the second video data through the display unit 25. For example, a driver can listen to the audio navigation guidance using the slave terminal 30 and watches the navigation screen on the display unit 25, while the passengers listen to the broadcast program audio output through the speaker 12 and watch the broadcast program screen on the display unit 25.

Data Processing System According Second Embodiment

Figure 7:
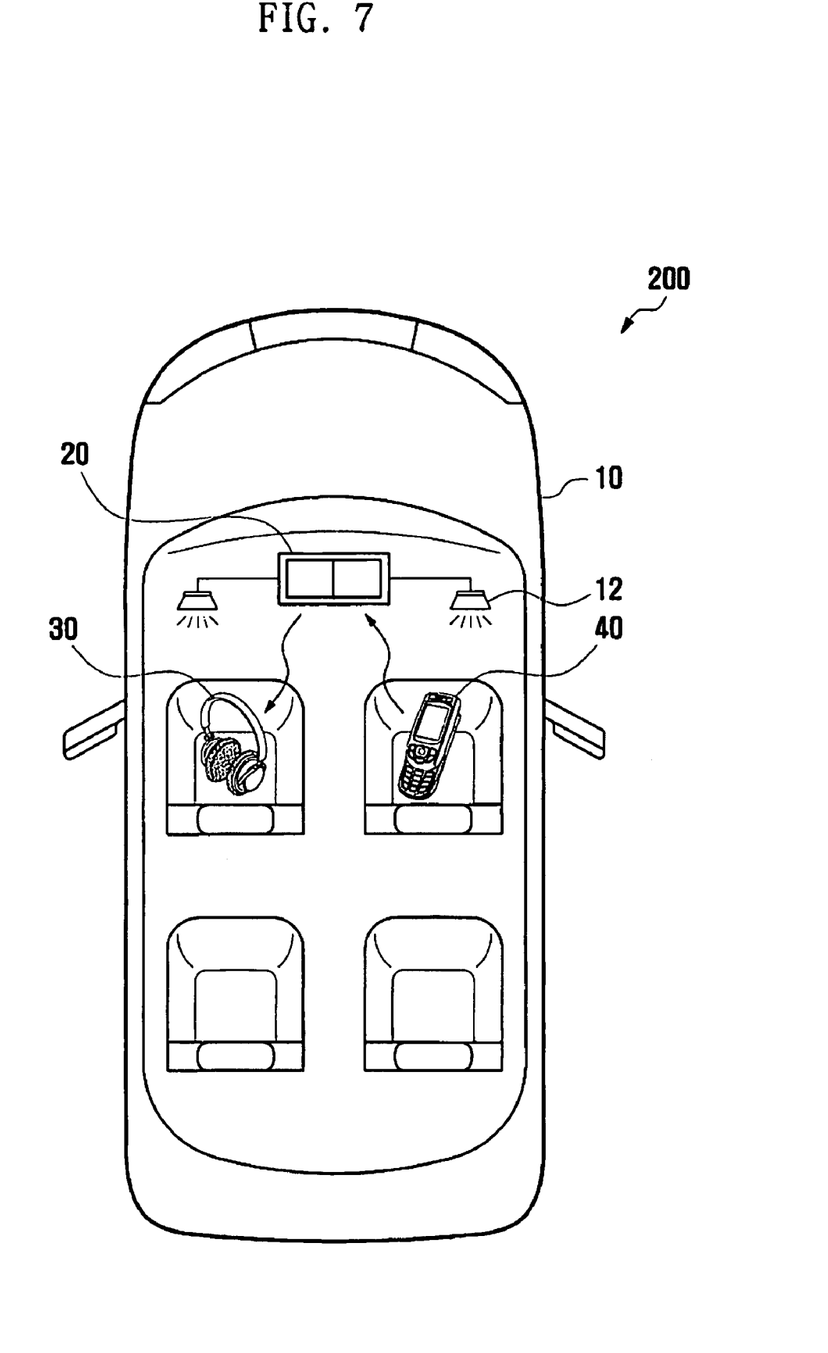
FIG. 7 is a schematic diagram illustrating an in-vehicle short range wireless network having a data processing system according to another exemplary embodiment of the present invention.

FIG. 7 is a schematic diagram illustrating an in-vehicle short range wireless network having a data processing system according to another exemplary embodiment of the present invention.

Referring to FIG. 7, the data processing system 100 implemented within a vehicle 10 includes a speaker 12, a master terminal 20, a first slave terminal 30, and a second slave terminal 40. Since the structures and functions of the speaker 12, master terminal 20, and the first slave terminal 30 are identical with those of the embodiment shown in FIG. 1, detailed descriptions are omitted.

Figure 8:
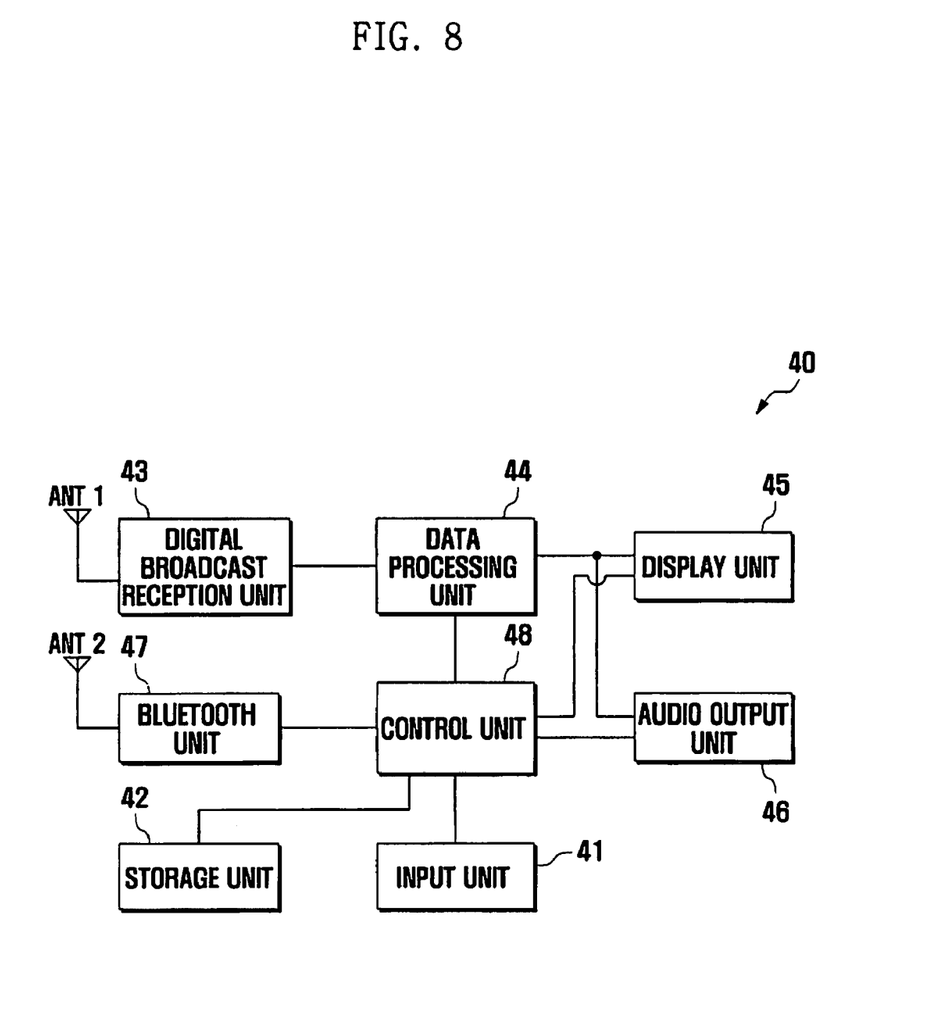
FIG. 8 is a block diagram illustrating a configuration of a second slave terminal 40 of FIG. 7.

FIG. 8 is a block diagram illustrating the second slave terminal 40 of FIG. 7. The second slave terminal 40 is set to operate as a slave in relation with the master terminal 20 according to Bluetooth protocol. In this embodiment, the second slave terminal 40 is a Bluetooth-enabled mobile phone supporting a digital broadcast reception.

The second slave terminal 40 includes an input unit 41, a storage unit 42, a digital broadcast reception unit 43, a data processing unit 44, a display unit 45, an audio output unit 46, a Bluetooth unit 47, and a control unit 48.

The input unit 41 is provided with a plurality of keys for manipulating the second slave terminal 40, and transfers signals generated by pressing the keys to the control unit 48. Particularly, the input unit 41 is provided with keys for controlling the short range wireless communication and digital broadcast playback.

The storage unit 42 stores application programs for executing various functions of the second slave terminal 40 and data generated while operating the functions.

The digital broadcast reception unit 43 receives a digital broadcast signal through an antenna (ANT1), demodulates the received digital broadcast signal, and outputs the demodulated broadcast data. The data processing unit 44 performs decoding on the output of the digital broadcast reception unit 43 and outputs video and audio data decoded form the digital broadcast data to the display unit 45 and the audio output unit 46.

The Bluetooth unit 47 enables the second slave terminal 40 to establish a Bluetooth channel with the master terminal 20 such that the second slave terminal 40 transmits the digital broadcast data to the master terminal 20 through an antenna (ANT2). Since the digital broadcast data includes the video and audio data, the Bluetooth unit 20 transmits the audio data in accordance with A2DP and the video data in accordance with a Video Distribution Profile (VDP).

The control unit 48 controls general operations of the second slave terminal 40. Particularly, the control unit 48 receives control signals input through the input unit 41 and controls the digital broadcast reception unit 43 which receives the digital broadcast signal, and the Bluetooth unit 47 transmits the digital audio data to the master terminal 20 through a short range wireless communication channel.

The master terminal 20 receives the digital broadcast data from the second slave terminal 40 through the short range wireless communication channel established between the master and second slave terminals 20 and 40. The master terminal 20 can displays the video data of the digital broadcast data as a second video data together with a first video data provided from another source. The master terminal 20 outputs the audio data of the digital broadcast data as a second audio data through the speaker 12.

Data Processing Method According to Fourth Embodiment

Figure 9:
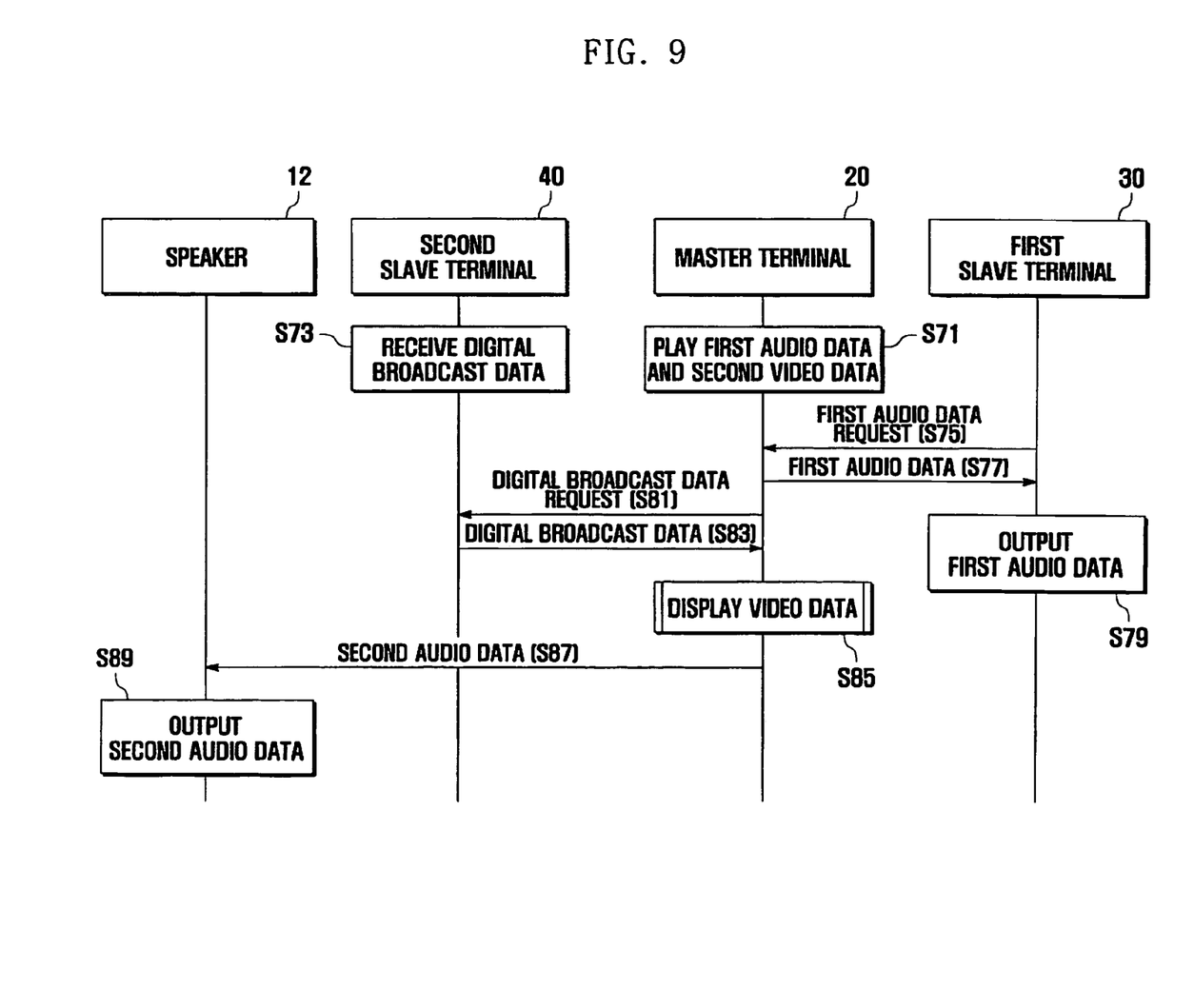
FIG. 9 is a signal flow diagram illustrating a data processing method according to an exemplary embodiment of the present invention.

FIG. 9 is a signal flow diagram illustrating a data processing method according to an exemplary embodiment of the present invention.

Referring to FIGS. 2, 3, and 7 to 9, the master terminal 20 is playing a first multimedia source providing first video and audio data in step S71, and the second slave terminal 40 is receiving the digital broadcast signal in step S73. The first video data is displayed on the display unit 25 of the master terminal 20. For example, if the first multimedia source is a navigation function, the first audio and video data represent the audio navigation guidance and the navigation screen.

If a first audio data request signal is received from the first slave terminal 30 through a short range wireless communication channel established between the master terminal 20 and the first slave terminal 30 in step S75, the master terminal 20 transmits the first audio data to the first slave terminal 30 through the short range wireless communication channel in step S77. The first slave terminal 30 outputs the first audio data received from the master terminal 20 through its audio output unit in step S79. Accordingly, a person having the first slave terminal 30 can listen to the first audio data using the first slave terminal 30 while viewing the first video data on the display unit 25 of the master terminal 20.

If a control signal is input for receiving multimedia data from an exterior device, i.e. the broadcast data from the second slave terminal 40, the master terminal 20 transmits a digital broadcast request signal to the second slave 40 in step S81. If a digital broadcast request signal is received, the second slave terminal 40 transmits the digital broadcast data to the master terminal 20 through a short range wireless communication channel in step S83. The master terminal 20 displays the video data of the received digital broadcast data, i.e. the second video data, on the display unit 25 in step S85 at the same time with the first video data, and transmits the audio data of the received digital broadcast data, i.e. the second audio data, to the speaker 12 in step S87 such that the speaker 12 outputs the second audio data in the form of audible sound in step S89.

The master terminal 20 can display the first and video data on the display unit 25 at the same time.

Figure 10:
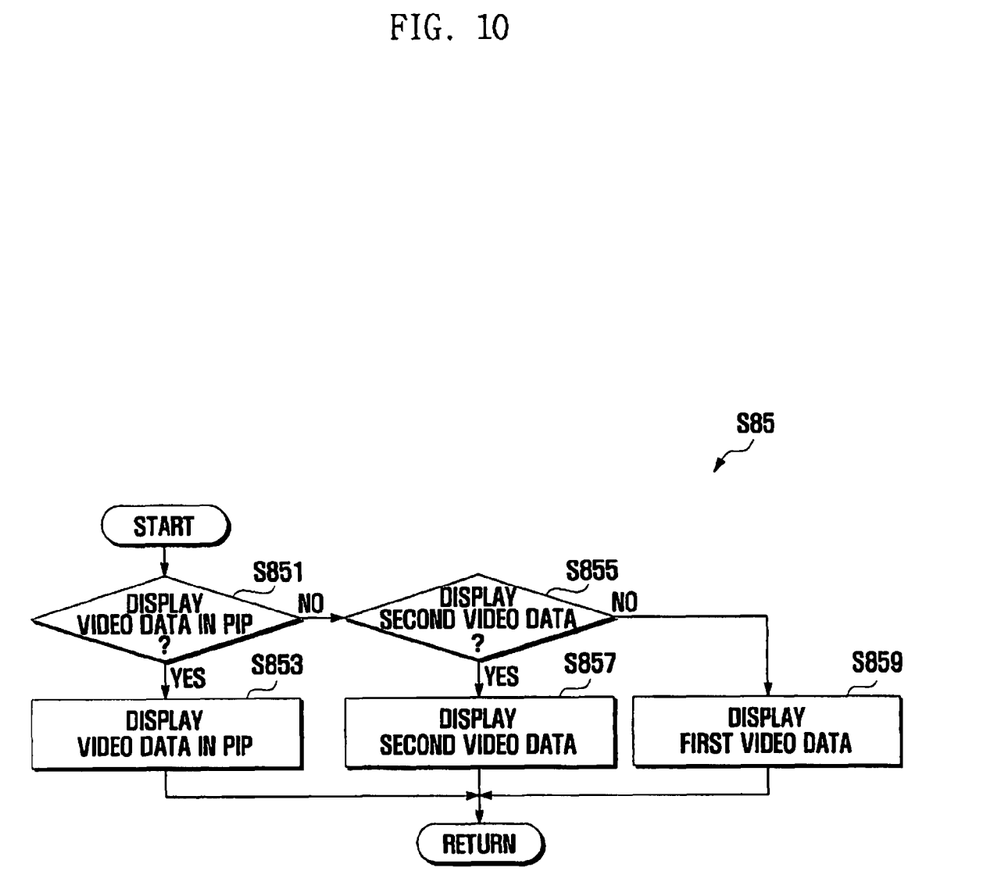
FIG. 10 is a flowchart illustrating a video data display procedure of the data processing method of FIG. 9.

FIG. 10 is a flowchart illustrating a video data display procedure of the data processing method of FIG. 9.

Referring to FIG. 9, the master terminal 20 allows selecting an option for how to display the first and second video data and determines whether a control signal for selecting a PIP-based display option is input in step S851. If a PIP selection signal is input through the input unit 21, the master terminal 20 displays the first and second video data on the display unit 25 at the same time in the form of PIP in step S853. If the control signal is not a PIP selection signal, the master terminal determines whether the control signal is a second video selection signal in step S855. If the control signal is a second video selection signal, the master terminal 20 displays only the second video data in step S857. If the control signal is not a second video selection signal, the master terminal 20 displays only the first video data on the display unit 25 in step S859.

If the digital video data includes only the audio data, the display unit 25 may be set for displaying the first video data. In this case, the control unit 26 of the master terminal 20 controls the display unit 25 to display the first video on the full screen.

Comparing the data processing methods according to the third and fourth embodiments of the present invention, the master terminal 20 directly receives the digital broadcast data in the data processing method of the third embodiment, while the master terminal 20 receives the digital broadcast data via the second slave terminal 40.

In the fourth embodiment, a person having the first slave terminal 30 can listen to the first audio data received from the master terminal 20 through a short range wireless communication channel while viewing the first video data on the display unit 25 of the master terminal 20, as in the third embodiment. A person who does not have the first slave terminal 30 listens to the second audio data output through the speaker 12 while viewing the second video data displayed on the display unit 25 of the master terminal 20. At this time, a person having the second slave terminal can watch the second video data, i.e. the video data of the digital broadcast data and listen to the second audio data, i.e. the audio data of the digital broadcast data, using second slave terminal itself. However, it is also possible to watch the second video data on the display unit 25 of the master terminal 20 while listening to the second audio data output through the speaker 12.

Although the master terminal 20 can start receiving the digital broadcast data after starting transmission of the first voice data to the first slave terminal 30 in this embodiment, the orders of the steps can be changed.

Data Processing System According to Third Embodiment

Figure 11:
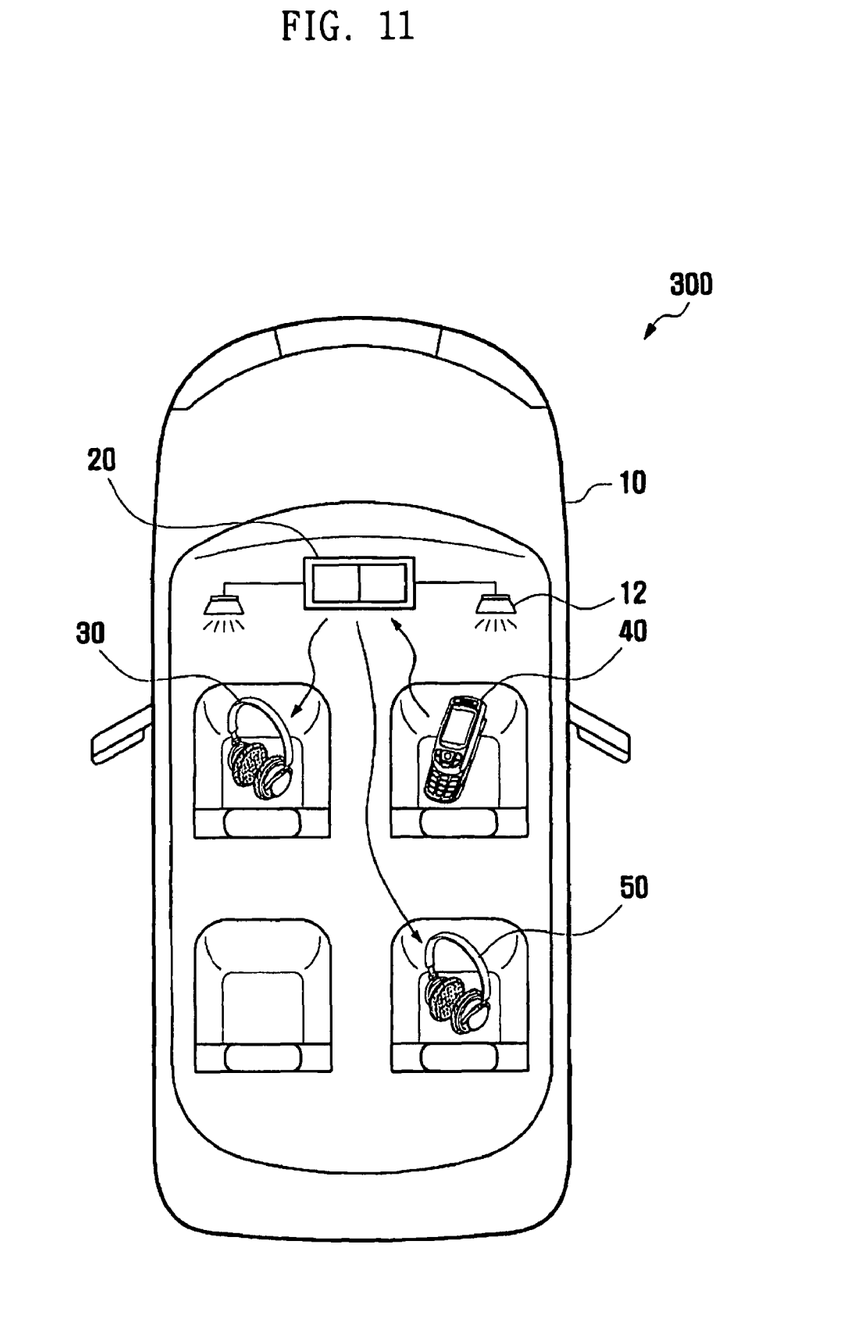
FIG. 11 is a schematic diagram illustrating an in-vehicle short range wireless network adopted a data processing system according to another exemplary embodiment of the present invention.

FIG. 11 is a schematic diagram illustrating an in-vehicle short range wireless network having a data processing system according to another exemplary embodiment of the present invention.

As shown in FIG. 11, the data processing system 300 further includes a third slave terminal 50, relative to the data processing system of the second embodiment of FIG. 7.

The third slave terminal 50 is set as a slave in relation to the master terminal 20 in accordance with Bluetooth protocol. The third terminal 50 is a Bluetooth-enabled wireless headset.

The third slave terminal 50 is connected to the master terminal 20 through a short range wireless communication channel, i.e. a Bluetooth channel, such that a passenger having the third slave terminal 30 can listen to the second audio data received from the master terminal 20. Although the first to third slave terminals 30, 40 and 50 are connected to the master terminal 20, a number of the slave terminals connected to the master terminal can be extended to seven (7). Accordingly, one (1) master and seven slave terminals can establish a piconet.

Data Processing Method According to Fifth Embodiment

Figure 12:
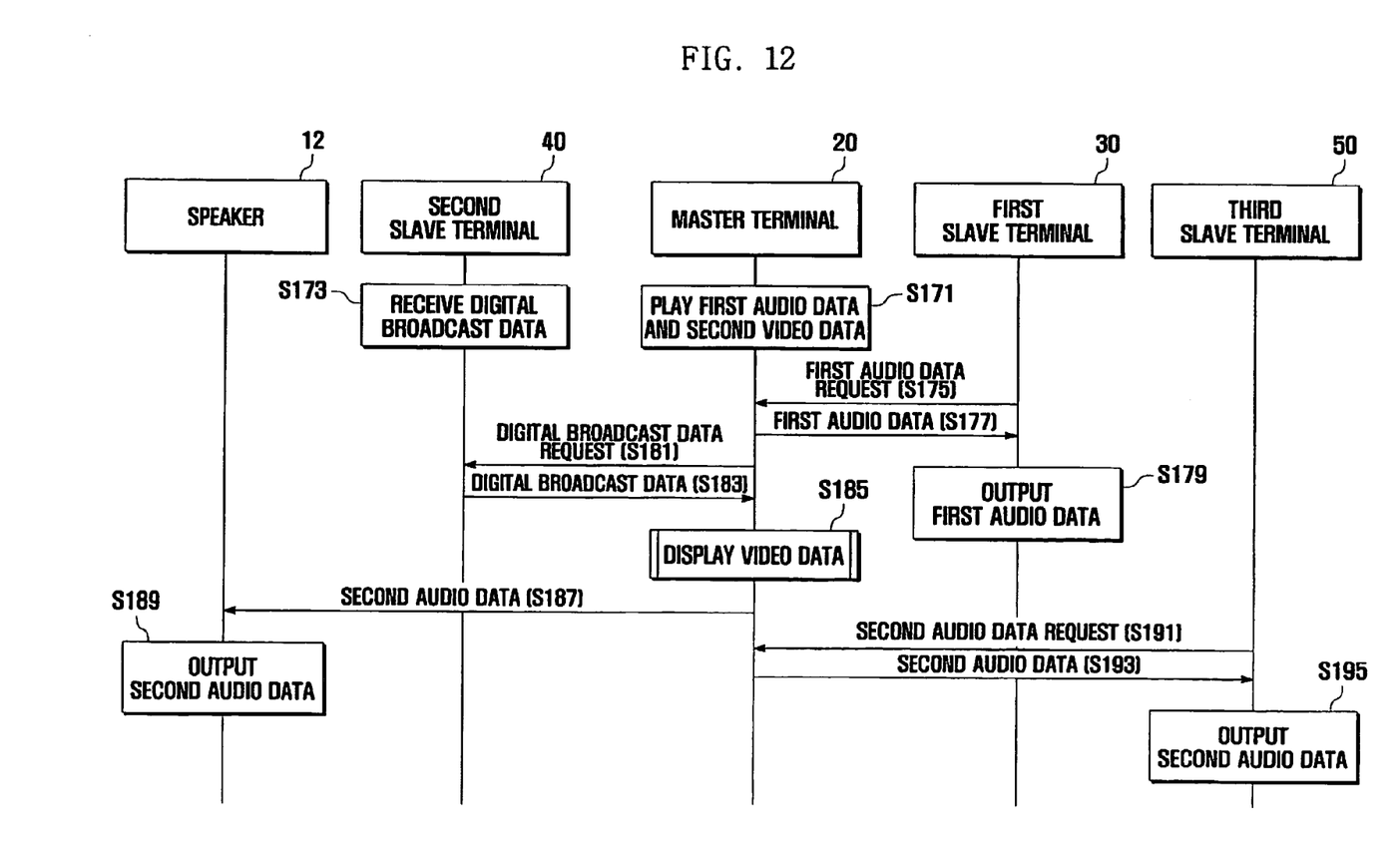
FIG. 12 is a signal flow diagram illustrating a data processing method according to another exemplary embodiment of the present invention.

FIG. 12 is a signal flow diagram illustrating a data processing method according to another exemplary embodiment of the present invention.

Referring to FIGS. 2, 11, and 12, the master terminal 20 is playing a first multimedia source providing first video and audio data in step S171, and the second slave terminal 40 is receiving the digital broadcast signal in step S173.

If a first audio data request signal is received from the first slave terminal 30 through a short range wireless communication channel established between the master terminal 20 and the first slave terminal 30 in step S175, the master terminal 20 transmits the first audio data to the first slave terminal 30 through the short range wireless communication channel in step S177. The slave terminal 30 outputs the first audio data received from the master terminal 20 through its audio output unit in step S179. Accordingly, a person having the first slave terminal 30 can listen to the first audio data using the first slave terminal 30 while viewing the first video data on the display unit of the master terminal 20.

If a control signal is input for receiving multimedia data from an exterior device, i.e. the broadcast data from the second slave terminal 40, the master terminal 20 transmits a digital broadcast request signal to the second slave 40 in step S181. If a digital broadcast request signal is received, the second slave terminal 40 transmits the digital broadcast data to the master terminal 20 through a short range wireless communication channel in step S183. The master terminal 20 displays the video data of the received digital broadcast data, i.e. the second video data, on the display unit in step S185 at the same time with the first video data, and transmits the audio data of the received digital broadcast data, i.e. the second audio data, to the speaker 12 in step S187 such that the speaker 12 outputs the second audio data in the form of audible sound in step S189.

If a second audio data request signal is received from the third slave terminal 50 through another short range wireless communication channel established between the master terminal 20 and the third slave terminal 50 in step S191, the master terminal 20 transmits the second audio data to the third slave terminal 50 through the short range wireless communication channel in step S193. The third slave terminal 50 outputs the second audio data received from the master terminal 20 through its audio output unit (not shown) in step S195. Accordingly, a passenger occupying the third slave terminal 50 can listen to the second audio data using the third slave terminal 50, while viewing the second video data on the display unit of the master terminal 20.

As described above, the data processing system and method of the present invention enable providing different audio data generated by different audio sources in a closed space such as in a vehicle.

Also, the data processing system and method of the present invention establish a short range wireless communication network, i.e. a piconet, including a master terminal and at least one slave terminal, and enable a person having the slave terminal to listen to first audio data transmitted by a multimedia source of the master terminal and persons that do not have a slave terminal to listen to second audio data output by another multimedia source of the master terminal through a speaker of the master terminal, while the viewing video data of the different multimedia sources on a display of the master terminal in a PIP form.

Also, the data processing system and method of the present invention establish an in-vehicle Bluetooth network with a multimedia terminal as a master device installed within a vehicle and a Bluetooth-enabled headset as a slave terminal, such that a driver can listen to an audio navigation guidance through the headset and passengers can listen to audio data of another multimedia source such as a digital broadcast program through a speaker of the vehicle while sharing a navigation screen and a digital broadcast program screen on a single display of the multimedia terminal in PIP form.

Although exemplary embodiments of the present invention are described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A data processing system for an in-vehicle network, the data processing system comprising:
   a speaker installed within a vehicle;
   a master terminal mounted onto the vehicle for outputting first audio data through the vehicle speaker;
   a first slave terminal for outputting second audio data received from the master terminal through a wireless channel established between the master terminal and the first slave terminal;
   a second slave terminal for receiving and wirelessly transmitting digital broadcast data to the master terminal; and
   a display unit of the master terminal,
   wherein, when the first slave terminal is occupied, a first audio source is activated to output the second audio data through the first slave terminal while the first audio data is output through the vehicle speaker, and
   when the first slave terminal is not occupied, an audio component of the digital broadcast data is output through the vehicle speaker and the first audio data is output through the first slave terminal while both first video data and a video component of the digital broadcast data are simultaneously displayed on the display unit of the master terminal.

2. The data processing system of claim 1, wherein the audio data output by the first slave terminal is identical to the audio data output through the speaker when the first slave terminal is not occupied.

3. The data processing system of claim 1, wherein the master terminal comprises:
   a first multimedia source for generating first audio and video data; and
   a second multimedia source for generating second audio and video data.

4. The data processing system of claim 3, wherein the first multimedia source is a navigation function and the first audio data is transmitted to the first slave terminal.

5. The data processing system of claim 4, wherein the second multimedia source is a digital broadcast reception function.

6. The data processing system of claim 1, further comprising a third slave terminal for receiving the audio data from the master terminal through another wireless channel established between the third slave terminal and the master terminal and for outputting the received audio data.

7. The data processing system of claim 6, wherein the wireless channels are Bluetooth radio channels.

8. The data processing system of claim 7, wherein the first and second audio data are transmitted in accordance with an Advanced Audio Distribution Profile (A2DP) and the first and second video data are transmitted in accordance with a Video Distribution Profile (VDP).

9. A data processing method for an in-vehicle wireless network, the method comprising:
   outputting an audio data of a first multimedia source of a master terminal through a speaker installed within a vehicle;
   outputting an audio data of a second multimedia source of the master terminal through a first slave terminal, and
   receiving transmitting digital broadcast data by a second slave terminal and wirelessly transmitting the digital broadcast data to the master terminal,
   wherein, when the first slave terminal is occupied, a first audio source is activated to output second audio data through the first slave terminal while the first audio data is output through the speaker, and
   when the first slave terminal is not occupied, an audio component of the digital broadcast data is output through the vehicle speaker and the first audio data is output through the first slave terminal while both first video data and a video component of the digital broadcast data are simultaneously displayed on a display unit of the master terminal.

10. The data processing method of claim 9, wherein the audio data output through the first slave terminal is identical to the audio data output through the speaker when the first slave terminal is not occupied.

11. The data processing method of claim 9, wherein outputting an audio data of the second multimedia source comprises:
  requesting, at the first slave terminal, the audio data of the second multimedia source; and
  transmitting, at the master terminal, the audio data of the second multimedia source to the first slave terminal.

12. The data processing method of claim 9, wherein the first multimedia source is a navigation function.

13. The data processing method of claim 12, wherein the second multimedia source is a digital broadcast function.

14. The data processing method of claim 12, wherein outputting an audio data of a first multimedia source comprises:
  transmitting, at the master terminal, the audio data of the first multimedia source to the first slave terminal through a wireless channel established between the speaker and the master terminal.

15. The data processing method of claim 14, wherein the wireless channel is a Bluetooth radio channel.

16. The data processing method of claim 15, the audio data are transmitted in accordance with an Advanced Audio Distribution Profile (A2DP) and the video data are transmitted in accordance with a Video Distribution Profile (VDP).

* * * * *